United States Patent
Koide

(10) Patent No.: US 7,199,853 B2
(45) Date of Patent: Apr. 3, 2007

(54) ELECTRO-OPTICAL DEVICE COMPRISING A STORAGE CAPACITOR WHEREIN THE SECOND CAPACITOR ELECTRODE HAS A DOUBLE LAYER ELECTRODE STRUCTURE AND METHOD FOR MANUFACTURING SEMICONDUCTOR ELEMENT

(75) Inventor: Kiyotaka Koide, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 143 days.

(21) Appl. No.: 10/430,311

(22) Filed: May 7, 2003

(65) Prior Publication Data

US 2004/0001168 A1 Jan. 1, 2004

(30) Foreign Application Priority Data

May 10, 2002 (JP) .............................. 2002-136237

(51) Int. Cl.
G02F 1/1343 (2006.01)
G02F 1/133 (2006.01)

(52) U.S. Cl. .......................... 349/147; 349/38; 349/39; 349/111; 349/138; 349/148

(58) Field of Classification Search .................. 349/38, 349/39, 44, 111
See application file for complete search history.

(56) References Cited

U.S. PATENT DOCUMENTS 5,182,661 A * 1/1993 Ikeda et al. .................... 349/38
6,088,071 A * 7/2000 Yamamoto et al. ........... 349/38
6,556,265 B1 * 4/2003 Murade ....................... 349/111
6,583,828 B1 * 6/2003 Wada et al. ................... 349/39
6,597,413 B2 * 7/2003 Kurashina ..................... 349/39
6,636,284 B2 * 10/2003 Sato ............................ 349/110
6,657,688 B2 12/2003 Nagata et al. .............. 349/113
6,665,024 B2 * 12/2003 Kurashina ..................... 349/39
2002/0014627 A1 2/2002 Sato ............................ 257/66

FOREIGN PATENT DOCUMENTS

| CN | 1343905 | | 4/2002 |
|---|---|---|---|
| JP | 2000267596 A | * | 9/2000 |
| JP | A 2001-265253 | | 9/2001 |
| JP | 2002122889 A | * | 4/2002 |
| KR | 2001-0110165 | | 12/2001 |
| KR | 2002-0010501 | | 2/2002 |

\* cited by examiner

*Primary Examiner*—Andrew Schechter
*Assistant Examiner*—W. Patty Chen
(74) *Attorney, Agent, or Firm*—Oliff & Berridge, PLC

(57) ABSTRACT

An electro-optical device includes pixel electrodes formed in a matrix above a substrate; a storage capacitor which is formed of a first capacitor electrode electrically connected to the pixel electrode, a second capacitor electrode electrically connected to a fixed potential, and a dielectric film disposed between the first capacitor electrode and the second capacitor electrode, and which are disposed to correspond to the pixel electrodes by using the second capacitor electrode as a capacitor line; a conductive pattern formed on the substrate; and a contact hole connecting the second capacitor electrode forming the storage capacitor to the conductive pattern.

6 Claims, 10 Drawing Sheets

FIG. 10
(a) 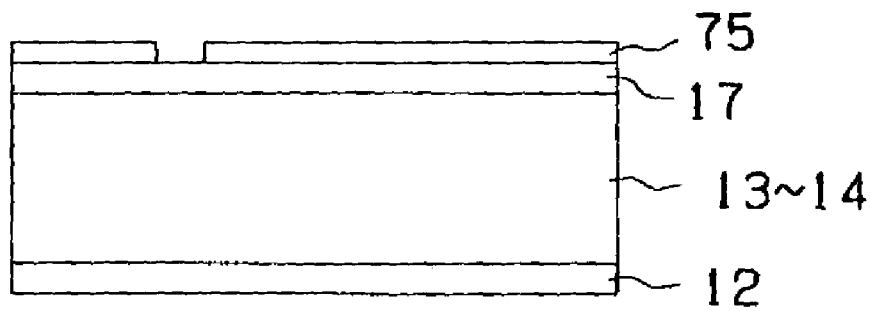
(b) 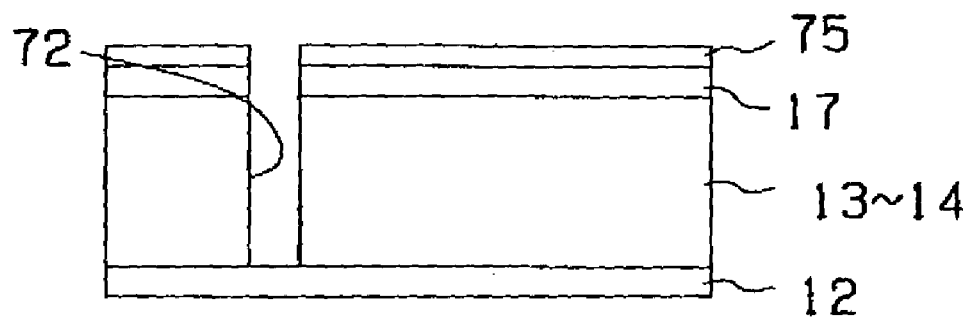
(c) 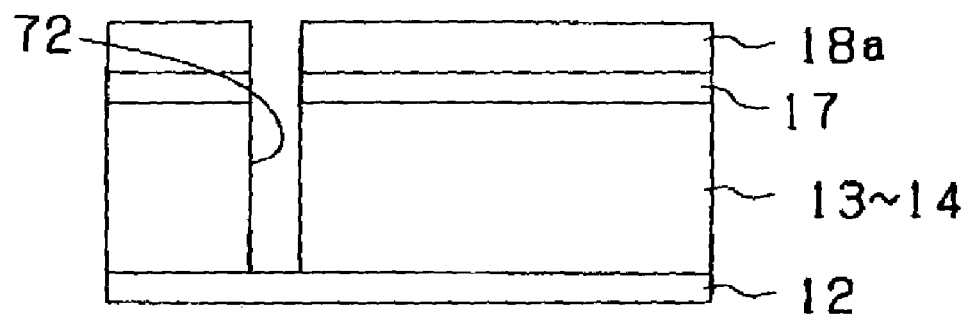

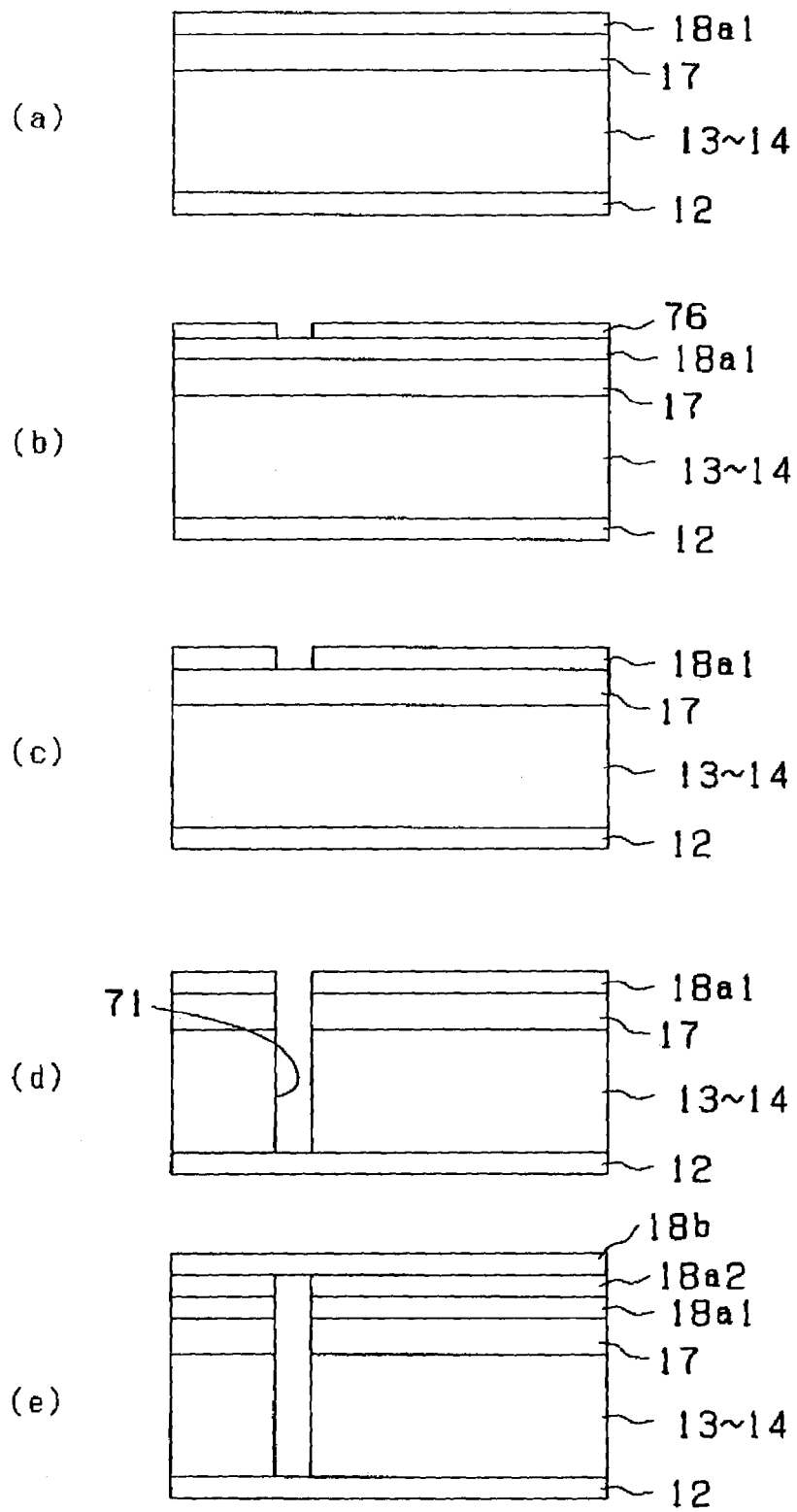

ELECTRO-OPTICAL DEVICE COMPRISING A STORAGE CAPACITOR WHEREIN THE SECOND CAPACITOR ELECTRODE HAS A DOUBLE LAYER ELECTRODE STRUCTURE AND METHOD FOR MANUFACTURING SEMICONDUCTOR ELEMENT

BACKGROUND OF THE INVENTION

1. Field of Invention

The present invention relates to electro-optical devices using thin-film transistors and methods of manufacturing semiconductor elements, for example.

2. Description of Related Art

Liquid crystal devices are each formed of two substrates, such as a glass substrate or a quartz substrate, and liquid crystal enclosed therebetween. In such a liquid crystal device, active elements, such as a thin-film transistor (hereinafter "TFT"), are disposed in a matrix on one of the substrates; a counter electrode is disposed on the other substrate; and optical properties of the liquid crystal layer enclosed between the two substrates are changed in accordance with image signals, whereby images are displayed.

Image signals are supplied by TFT elements to pixel electrodes composed of ITO (indium tin oxide) and arranged in a matrix, and voltages are applied to the liquid crystal layer between the pixel electrodes and the counter electrode in accordance with the image signals, thereby changing the arrangement of liquid crystal molecules. Accordingly, the transmittance of each of the pixels is changed, and light passing through each of the pixel electrodes and the liquid crystal layer is modulated in accordance with an image signal, thereby displaying an image.

A TFT is placed in an ON state by supplying a scanning signal to the gate electrode through a scanning line, and by supplying an image signal to the source region of a semiconductor layer through a data line, the image signal is supplied to the pixel electrode through the TFT placed in an ON state. Since the supply of the image signal is performed for each pixel electrode within only a very short period of time, in order to maintain the voltage of the image signal for a time much longer than that in which the voltage is applied so that the TFT is placed in an ON state, a storage capacitor is generally added to each pixel electrode.

In the liquid crystal device, between a conductive film, such as an ITO film, forming a pixel electrode and a semiconductor layer forming a pixel switching TFT, a plurality of films is formed having a laminate structure which includes various conductive films, such as a scanning line and a data line, and insulating films, such as a gate insulating film and interlayer insulating films, to insulate the conductive films described above from each other. The distance between the pixel electrode and the semiconductor layer is, for example, approximately 1,000 nm. Hence, from a technical point of view, it has been difficult to electrically connect the pixel electrode and the semiconductor layer to each other with one contact hole. Accordingly, a technique has been developed in which an intermediate conductive layer is formed between interlayer insulating films to electrically connect the pixel electrode and the semiconductor layer.

In the liquid crystal device, higher quality of display image is generally advantageous, and hence, in addition to an increase in pixel aperture ratio (that is, an aperture area through which display light passes is increased in each pixel), it is important that wiring resistances of the various wires, such as the data line, scanning line, and capacitor line, be decreased.

Concomitant with providing a higher aperture ratio of pixels which are provided at fine intervals, the line widths of the data line and the scanning line itself can also be decreased. However, the scanning lines and the data lines are generally formed of a conductive polycrystalline silicon film for the following reasons. For example, (i) heat treatment at a high temperature must be performed after the formation of the scanning lines and the data lines; and (ii) the scanning lines are also used as the gate electrodes of the thin-film transistors.

Accordingly, concomitant with providing a higher aperture ratio of pixels which are provided at fine intervals, as described above, when the line widths of the scanning line and the data line are decreased, or driving frequency is increased concomitant with providing a finer and more accurate structure, the time constant of the capacitor line becomes a problem. That is, when the aperture ratio of the pixel is increased, due to the wiring resistance of the capacitor line, problems become serious in that crosstalk or a ghost is generated in the lateral direction along the scanning lines and in that the quality of display image, such as the contrast ratio, is degraded.

In addition, in a TFT active matrix drive liquid crystal device, when a channel region of a pixel switching TFT provided in each pixel is irradiated with incident light, due to excitation caused by the light, a light leak current is generated, and as a result, the properties of the TFT are varied. In particular, when the liquid crystal device is used for a liquid crystal light valve of a projector, since the intensity of incident light is high, it becomes important that incident light be shaded in the channel region of the TFT and the vicinity thereof. Hence, the structure is formed in that the channel regions and the vicinities thereof are shaded by a shading film which defines the aperture area of each pixel and which is provided for a counter substrate.

In addition, in order to obtain a high aperture ratio of the pixel, that is, in order to increase the ratio of the aperture area of each pixel, a technique has been developed in which, in addition to the shading film provided for the counter substrate, the channel regions and the vicinities thereof are shaded by a shading film embedded in the TFT array substrate or by the data lines which are composed of a metal film, such as Al (aluminum), extending over the TFT.

However, since the distance between the TFT element and the counter substrate or the data line is relatively large, sufficient shading properties have not been obtained by the data lines and the shading film formed on the counter substrate.

In order to address or solve the above, in Japanese Unexamined Patent Application Publication No. 2001-265253, an electro-optical device is disclosed in which, in addition to improvement in shading properties for the TFT elements, a satisfactory storage capacitor can be formed and in which the resistance of the capacitor line can also be decreased.

In this proposal, an intermediate conductive layer having shading properties is formed to electrically connect the semiconductor layer forming the TFT and the pixel electrode. In addition, the storage capacitor is formed by using an upper capacitor electrode and a lower capacitor electrode opposing thereto with a thin insulating film provided therebetween, and a capacitor line formed of the same layer as that for the intermediate conductive layer is connected to the upper capacitor electrode. Accordingly, by using shading areas of individual pixels through which the scanning lines are formed, capacitor lines each having a large width and a large length from the image display area to the periphery thereof can be formed above the scanning lines, and hence, in addition to a sufficient capacitance, a low resistance can be obtained.

SUMMARY OF THE INVENTION

In the above structure, since the intermediate conductive layer is connected to the pixel electrode, and the capacitor line forming the storage capacitor in each pixel is formed of the same layer as that for the intermediate conductive layer, the capacitor line is electrically connected to the pixel electrode. However, since being formed, for example, of tungsten silicide, the intermediate conductive layer has a high stress. Accordingly, the capacitor line is very likely to be broken since it is formed of the material having a high stress described above.

In addition, since the capacitor line is formed along the scanning line, when the capacitor line is broken, every pixel electrode disposed in the same line cannot retain a voltage for an image signal. That is, since every pixel disposed in the same line cannot properly display an image because of the capacitor line which is likely to be broken, a strip-shaped defect occurs, and the display quality will probably be very degraded.

In consideration of the above and/or other problems, the present invention provides an electro-optical device and a manufacturing method thereof, in which the quality of display image is enhanced by further decreasing the resistance of the capacitor line, in which even when the capacitor line is broken, degradation of display is allowed to occur only in one pixel so that high quality of image display can be maintained, and in which the generation of initial withstand voltage failure can be reduced or suppressed.

An electro-optical device of the present invention includes: pixel electrodes provided in a matrix above a substrate; a storage capacitor which is formed of a first capacitor electrode electrically connected to the pixel electrode, a second capacitor electrode electrically connected to a fixed potential, and a dielectric film disposed between the first capacitor electrode and the second capacitor electrode, and which is disposed to correspond to the pixel electrode by using the second capacitor electrode as capacitor line; a conductive pattern formed above the substrate; and a contact hole connecting the second capacitor electrode forming the storage capacitor to the conductive pattern.

According to the structure described above, the pixel electrodes are formed in a matrix above the substrate. The first capacitor electrode is connected to the pixel electrode, and the second capacitor electrode is connected to the fixed potential. The dielectric film is disposed between the first capacitor electrode and the second capacitor electrode, thereby forming the storage capacitor. The storage capacitor uses the second capacitor electrode as the capacitor line and is disposed so as to correspond to the pixel electrode. In addition, the conductive pattern is formed above the substrate. The contact hole connect between the second capacitor electrode of the storage capacitor and the conductive pattern. The storage capacitor is connected to the pixel electrode. Since the second capacitor electrode of the capacitor line which form the storage capacitor, which is provided corresponding to the pixel, is connected to the conductive pattern, even when the capacitor line is broken, the second capacitor electrode of the storage capacitor corresponding to the other pixels are still connected to the fixed potential by the conductive pattern. That is, the conductive pattern forms a reductant wire of the capacitor line. The resistance of the capacitor line can be decreased by the conductive pattern, and in addition, the influence of breakage of one of the capacitor line on the other pixels can be reduced or minimized.

The contact hole may be formed so as to penetrate at least one interlayer film.

According to the structure described above, even when a multilayer structure is formed, the capacitor line and the conductive pattern can be connected to each other.

The second capacitor electrode may be composed of an upper layer and a lower layer, in which the lower layer is formed before the contact hole is formed, and in which the upper layer is formed after the contact hole is formed.

According to the structure described above, the lower layer forming the second capacitor electrode is formed before the contact hole is formed. For example, after the dielectric film is formed, the lower layer is formed, the contact hole is then formed, and subsequently, the upper layer of the second capacitor electrode is formed. In a lithographic step necessary to form the contact hole, since being covered with the lower layer of the second capacitor electrode for protection, the dielectric film can be prevented from being damaged in the lithographic step, or the damage can be reduced. Accordingly, the generation of the initial withstand voltage failure can be avoided or reduced.

The conductive pattern may be formed so as to correspond to the pixel electrode.

According to the structure described above, since being formed so as to correspond to the pixel, the conductive pattern is easily connected thereto through the contact hole, and in addition, the optical influence of the conductive pattern on the pixel is small.

The pixel electrodes may be driven by pixel transistors formed above the substrate, and the conductive pattern may be formed under the pixel transistors.

According to the structure described above, the present invention may be applied to an active matrix electro-optical device.

In addition, an electro-optical device of the present invention includes: a conductive pattern in a matrix formed above a substrate so as to correspond to pixel positions; pixel transistors formed in a matrix, each of the pixel transistors including a channel region, a source region, and a drain region, which are formed in the same semiconductor layer provided above the conductive pattern with a first interlayer film provided therebetween; first capacitor electrode formed above the pixel transistor with a second interlayer film provided therebetween; a dielectric film formed on the first capacitor electrode; a second capacitor electrode which is formed on the dielectric film and which functions as a capacitor line; and a contact hole connecting the second capacitor electrode to the conductive pattern.

According to the structure described above, the conductive pattern is formed in a matrix above the substrate so as to correspond to the pixel position. The pixel transistors each have the channel region, the source region, and the drain region in the same semiconductor layer formed above the conductive pattern with the first interlayer provided therebetween. Above the pixel transistors, the first capacitor electrode are formed with the second interlayer film provided therebetween, and on the first capacitor electrode and the second interlayer, the dielectric film is formed. On the dielectric film, the second capacitor electrode is formed, and the storage capacitor is formed of the first capacitor electrode, the dielectric film, and the second capacitor electrode.

The second capacitor electrode forming the storage capacitor is connected to the conductive pattern through the contact hole. Hence, even when one of the capacitor line is broken, the second capacitor electrode of the storage capacitor of the other pixel is connected to each other with the conductive pattern. That is, the conductive pattern forms a reductant wire of the capacitor line and can decrease the resistances thereof.

The second capacitor electrode may be formed of a polycide film including a metal silicide and polycrystalline silicon.

According to the structure described above, the metal silicide has a shading function in which light incident on areas other than the pixel electrodes are blocked, thereby enhancing the electro-optical properties.

The second capacitor electrodes may be formed of a polycide film including a silicide containing one of tungsten, molybdenum, titanium, and tantalum and N-type polycrystalline silicon.

According to the structure described above, the second capacitor electrode having a shading function can be relatively easily formed.

A method of manufacturing a semiconductor element, according to the present invention, includes: forming a conductive pattern above a substrate; forming first capacitor electrodes to be electrically connected to a pixel electrode above the conductive pattern with at least one interlayer film provided therebetween; forming a dielectric film on the first capacitor electrode; forming a lower capacitor electrode disposed on the dielectric film, the lower capacitor electrode being a part of a second capacitor electrode which forms storage capacitors together with the first capacitor electrode and the dielectric film; forming a contact hole by forming an opening in the lower capacitor electrode and then forming an opening in the dielectric film and the at least one interlayer film using the lower capacitor electrode having the opening therein as a mask; and forming an upper capacitor electrode on the lower capacitor electrode which includes the contact hole formed in the lower capacitor electrode, the dielectric film, and the at least one interlayer film.

According to the structure described above, the conductive pattern is formed above the substrate. Above this conductive pattern, the first capacitor electrode to be connected to the pixel electrode is formed with the at least one interlayer provided therebetween. On the first capacitor electrode, the dielectric film is formed, and on the first capacitor electrode and the dielectric film, the lower capacitor electrode is formed. That is, in the state described above, the lower capacitor electrode covers the dielectric film. An opening is formed in the lower capacitor electrode, and by using the lower capacitor electrode provided with the opening thus formed as mask, the contact hole is provided by forming the opening in the dielectric film and the at least one interlayer. Before the contact hole is formed, the dielectric film is covered with the lower capacitor electrodes for protection, and hence damage may not be done to the dielectric film when the contact hole is formed. Accordingly, the generation of the initial withstand voltage failure can be avoided or reduced.

The step of forming the contact holes, described above, may include: forming a resist layer on the lower capacitor electrode; forming the opening in the lower capacitor electrode using the resist layer as a mask; removing the resist layer; and subsequently forming the opening in the dielectric film and the at least one interlayer film using the lower capacitor electrode provided with the opening as a mask.

According to the structure described above, before the contact hole is formed, the lower capacitor electrode is formed on the dielectric film. When the contact hole is formed, the resist layer is formed on the lower capacitor electrode, and the opening is formed in the lower capacitor electrode by using the resist layer. Next, the resist layer is removed. The resist layer is not formed on the dielectric film, and hence the dielectric film is not damaged when the resist layer is removed. By using the lower capacitor electrode provided with the opening, which is obtained after the resist layer is removed, as mask, the opening is formed in the dielectric film and the at least one interlayer, thereby forming the contact hole. In a lithographic step necessary to form the contact hole, the dielectric film is not damaged, and hence the generation of the initial withstand voltage failure can be avoided or reduced.

The lower capacitor electrode and the upper capacitor electrode may be formed of polycrystalline silicon.

According to the structure described above, since the same material is used, the manufacturing process may not be complicated or overly complicated.

The polycrystalline silicon may be provided with a metal silicide thereon.

According to the structure described above, since the metal silicide has a shading function, light incident on areas other than the pixel electrodes is blocked, and hence the electro-optical properties can be enhanced.

These and other features and advantages of the present invention will be understood from the following exemplary embodiments described below.

BRIEF DESCRIPTION OF THE DRAWINGS

FIGS. 10(a)–10(c) are schematics illustrating why the manufacturing method shown in FIG. 8 is advantageous;

FIGS. 11(a)–11(e) are schematics showing sequential steps of manufacturing a contact hole 71 in accordance with the manufacturing method shown in FIG. 8.

DETAILED DESCRIPTION OF PREFERRED EMBODIMENTS

Figure 1:
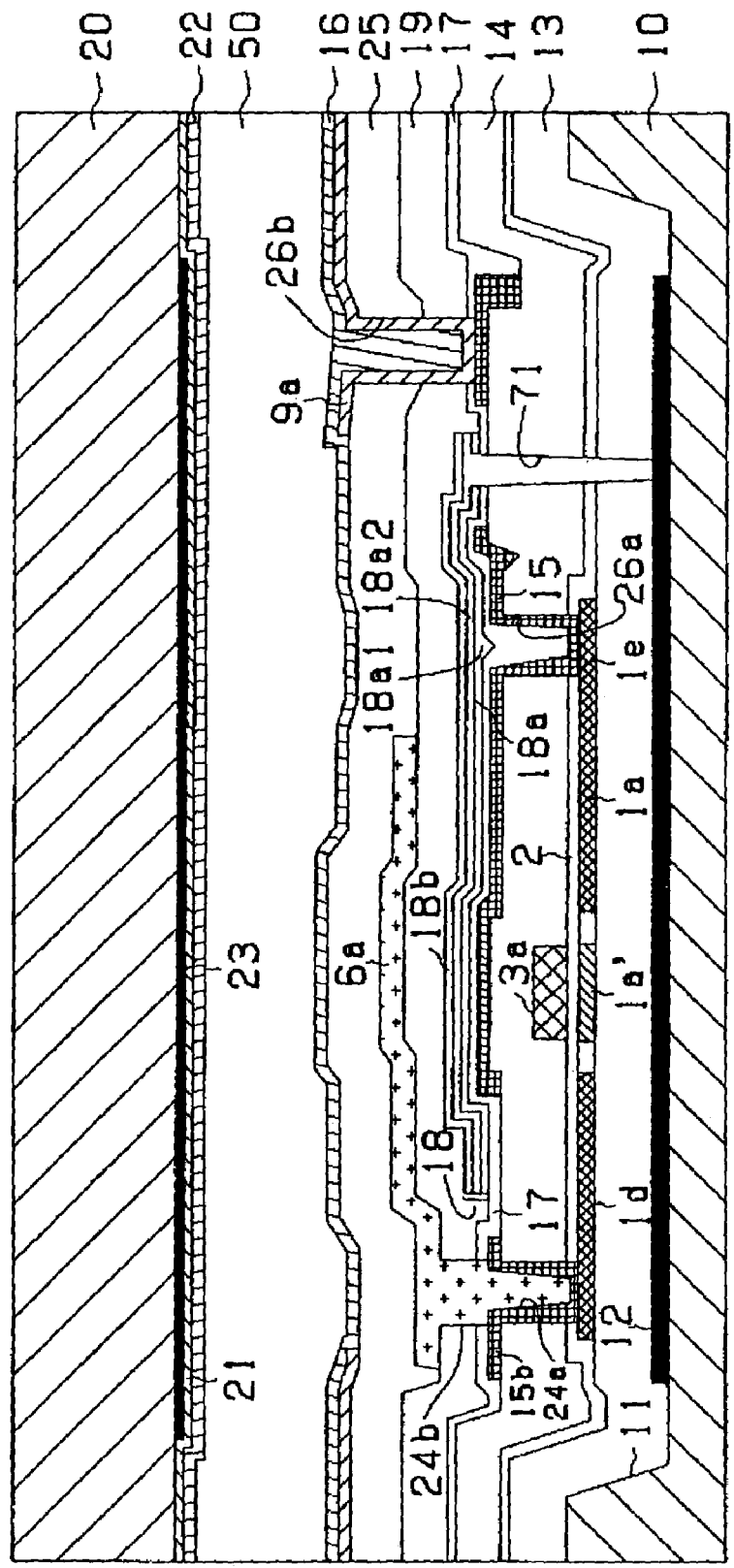
FIG. 1 is a cross-sectional view of an electro-optical device of a first exemplary embodiment of the present invention.
Figure 2:
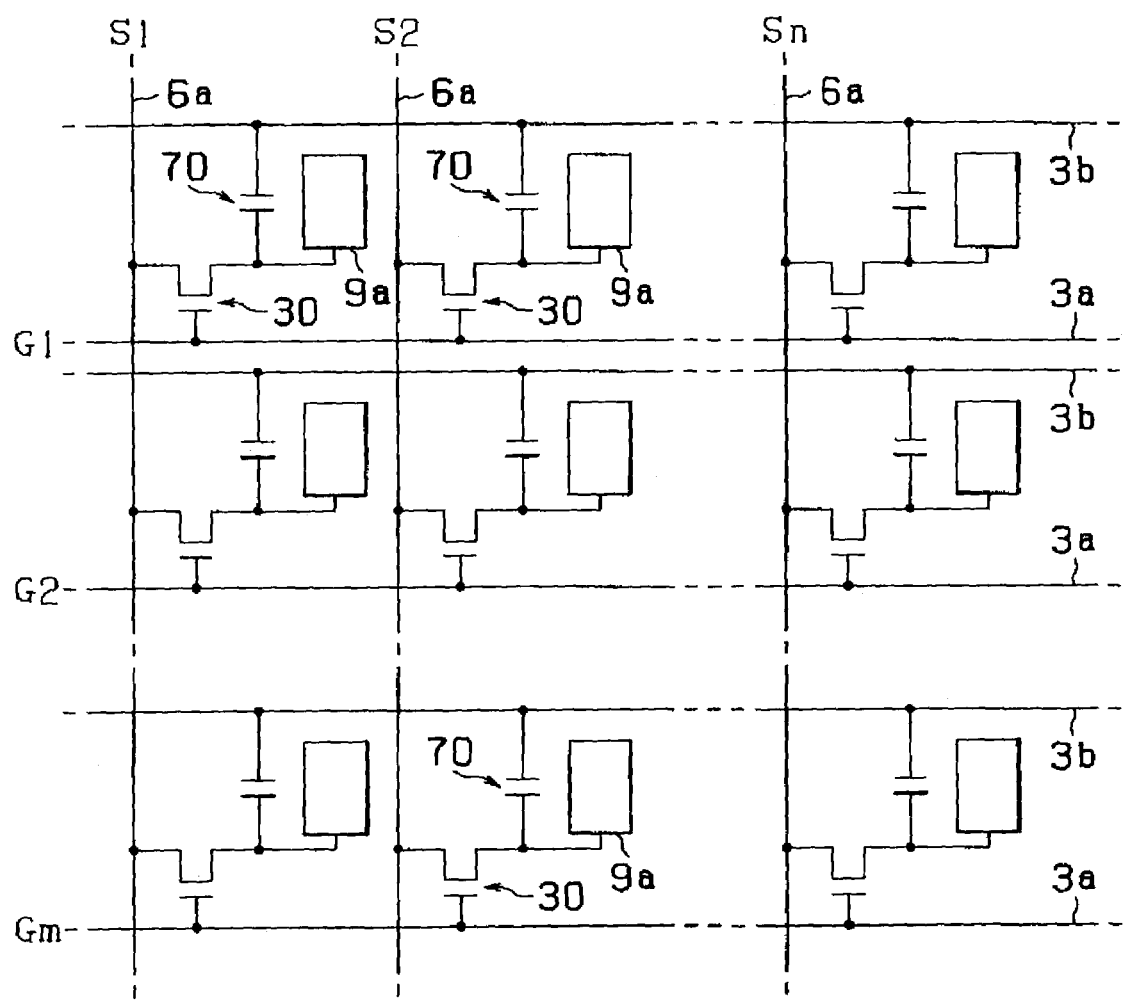
FIG. 2 is a schematic circuit diagram of various elements, wires, and the like of a plurality of pixels forming a pixel area of a liquid crystal device.
Figure 3:
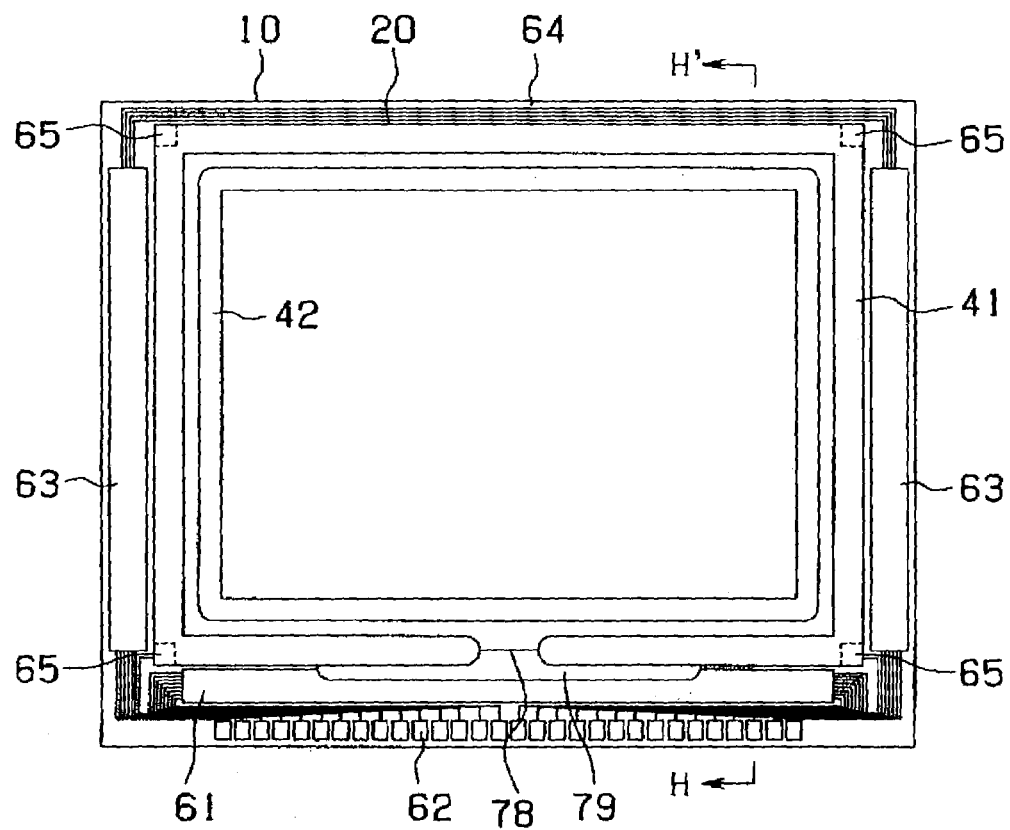
FIG. 3 is a plan view showing a TFT array substrate and various constituent elements formed thereon, the TFT array substrate being viewed from a counter substrate side.
Figure 4:
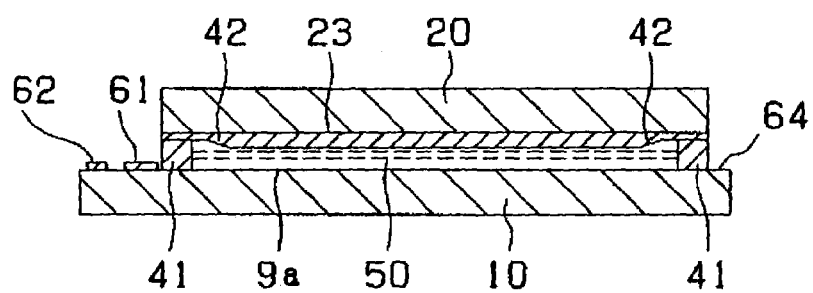
FIG. 4 is a cross-sectional view of a liquid crystal device taken along plane H-H' in FIG. 3, the liquid crystal device being in the state after an assembly step in which the TFT array substrate and the counter substrate are adhered to each other and liquid crystal is then enclosed therebetween.
Figure 5:
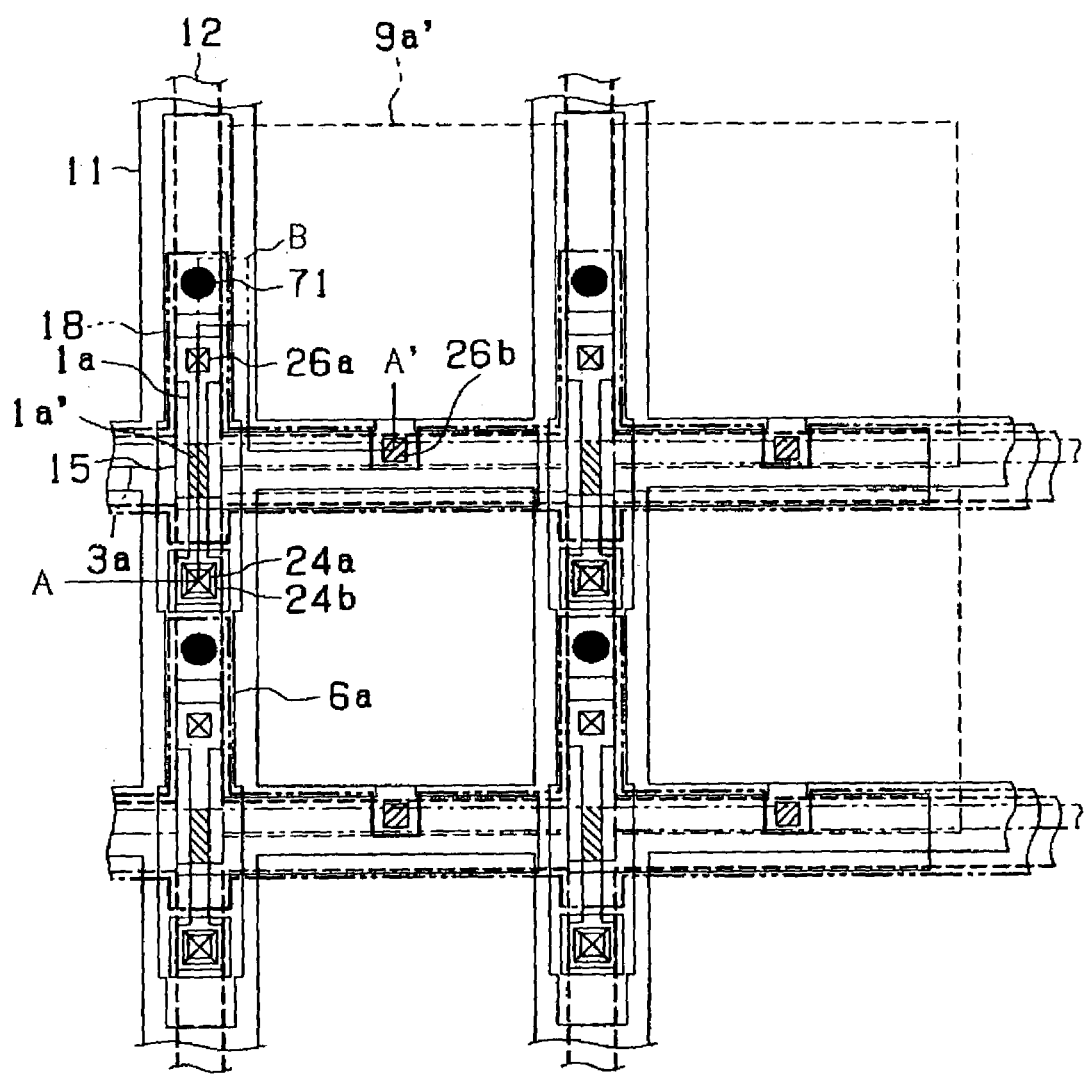
FIG. 5 is a plan view of a plurality of pixels adjacent to each other on a TFT array substrate on which data lines, scanning lines, pixel electrodes, and the like are formed.
Figure 6:
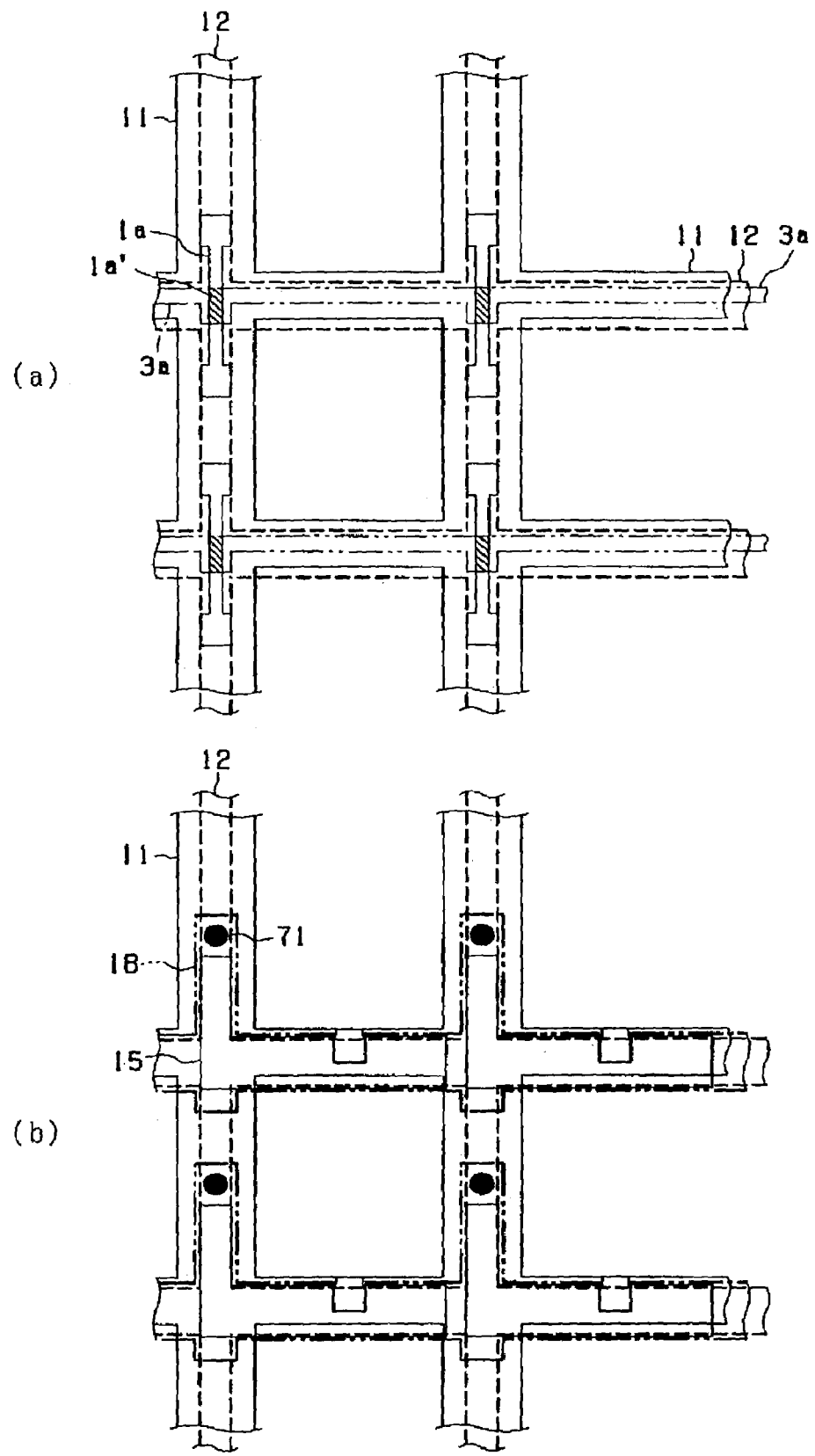
FIGS. 6(a) and 6(b) are plan views in each of which only a major portion among the various elements shown in FIG. 5 is shown.
Figure 7:
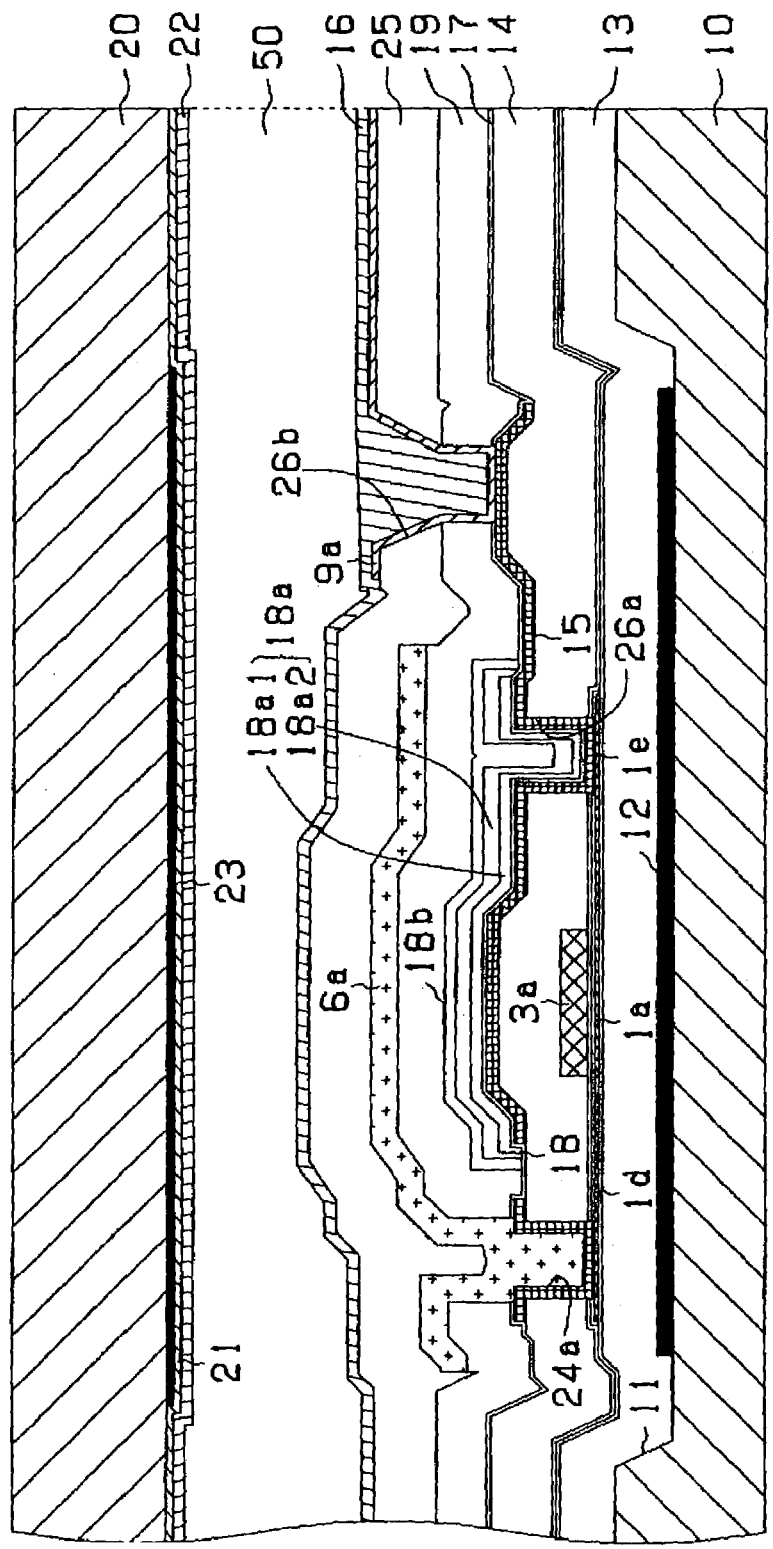
FIG. 7 is a cross-sectional view taken along plane A-A' shown in FIG. 5.

Hereinafter, exemplary embodiments of the present invention are described in detail with reference to figures. In the exemplary embodiments, an electro-optical device of the present invention is applied to a liquid crystal device. FIG. 1 is a schematic cross-sectional view showing an electro-optical device according to a first exemplary embodiment. FIG. 2 is a schematic circuit diagram of various elements, wires, and the like of a plurality of pixels forming a pixel area of a liquid crystal device. FIG. 3 is a plan view showing a TFT array substrate and various constituent elements formed thereon, the TFT array substrate being viewed from a counter substrate side, and FIG. 4 is a cross-sectional view of the liquid crystal device taken along plane H-H' in FIG. 3, the liquid crystal device being in the state after an assembly step in which the TFT array substrate and the counter substrate are adhered to each other and in which liquid crystal is then enclosed therebetween. FIG. 5 is a plan view of a plurality of pixels adjacent to each other on a TFT array substrate on which data lines, scanning lines, pixel electrodes, and the like are formed. FIGS. 6(a) and 6(b) are plan views, each of which only shows a significant portion among various elements in FIG. 5. FIG. 7 is a schematic cross-sectional view taken along plane A-A' shown in FIG. 5. In addition, FIG. 1 is a cross-sectional view taken along plane A-B (oblique line)—A' in FIG. 5.

In this exemplary embodiment, a conductive shading film having a grating pattern corresponding to the pixels is formed under TFTs, and by forming contact holes each penetrating from an upper capacitor electrode forming a capacitor line to the shading film, the capacitor lines and the shading film are electrically connected to each other so that the shading film is used as a redundant wire of the capacitor lines. Accordingly, when short-circuiting occurs, damage done to the pixels can be reduced or minimized.

First, the structure of the pixel of the liquid crystal device of the first exemplary embodiment according to the present invention is described with reference to FIGS. 1 to 7.

As shown in FIGS. 3 and 4, the liquid crystal device is formed of a transparent TFT array substrate 10, a counter substrate 20, and liquid crystal 50 enclosed therebetween. The TFT array substrate 10 is formed, for example, of a quartz substrate, a glass substrate, or a silicon substrate, and the counter substrate 20 is formed, for example, of a glass substrate or a quartz substrate. On the TFT array substrate 10, pixel electrodes and the like forming the pixels are arranged in a matrix. FIG. 2 is a schematic circuit diagram of elements, which form the pixels, on the TFT array substrate 10.

In FIG. 2, in each of a plurality of the pixels arranged in a matrix, which form an image display area of an electro-optical device of this exemplary embodiment, a pixel electrode 9a and a TFT 30 controlling the pixel electrode 9a are formed, and a data line (source line) 6a to which an image signal is supplied is electrically connected to a source of the TFT 30. Image signals S1, S2, ..., and Sn to be written into the data lines 6a may be supplied in that order in a line sequential manner or may be supplied to each group formed of the data lines 6a adjacent to each other.

In addition, the scanning lines 3a are connected to gates of the TFTs 30, and scanning signals G1, G2, ..., and Gm in the form of pulse are applied to the scanning lines 3a in that order in a line sequential manner. The pixel electrodes 9a are electrically connected to drains of the TFTs 30, and by closing the switches of the TFTs 30 used as a switching element for a predetermined period of time, the image signals S1, S2, ..., and Sn supplied from the data lines 6a are written at predetermined timings. The image signals S1, S2, ..., and Sn having a certain level and being written in liquid crystal, which is an example of an electro-optical material, through the pixel electrodes 9a are retained for a predetermined period of time with a counter electrode, which is described below, formed on the counter substrate.

Since the alignment and ordering of the molecular aggregate of the liquid crystal are changed in accordance with the level of a voltage applied thereto, light is modulated, and hence, gray scale display can be performed. In the case of a normally-white mode, the transmittance of incident light in each pixel is decreased in accordance with a voltage applied thereto, and when a normally-black mode is used, the transmittance of incident light in each pixel is increased in accordance with a voltage applied thereto, whereby, on the whole, light having contrast corresponding to an image signal is emitted from the electro-optical device. In order to prevent or reduce leakage of the retained image signals, a storage capacitor 70 is additionally provided in parallel with a liquid crystal capacitor formed between the pixel electrode 9a and the counter electrode.

In FIGS. 1, and 5 to 7, in the TFT array substrate 10 formed, for example, of glass or quartz, a groove 11 having a grating pattern is formed. Over the groove 11, the TFT 30 having an LDD (lightly doped drain) structure is formed with a lower shading film 12 and a first interlayer insulating film 13 provided therebetween. By the presence of the groove 11, the boundary surface between the liquid crystal 50 and the TFT substrate side is planarized.

Above the TFT array substrate 10, a plurality of transparent pixel electrodes 9a (outline is indicated by a dotted portion 9a' shown in FIG. 5) is provided in a matrix, and along the longitudinal and the lateral boundaries of the pixel electrodes 9a, the data lines 6a and the scanning lines 3a are provided, respectively. In addition, the lower shading film 12 having a grating pattern is formed along the data lines 6a and the scanning lines 3a so as to correspond to the individual pixels.

The lower shading film 12 is formed of a metal, an alloy, a metal silicide, a polysilicide, and a laminate thereof, each of which contains at least one high melting point metal selected from the group including Ti, Cr, W, Ta, Mo, Pb, and the like, for example.

In the TFT 30, the scanning line 3a used as a gate electrode is provided above a semiconductor layer 1a with an insulating film 2, used as a gate insulating film, provided therebetween, the semiconductor layer 1a comprising a channel region 1a', a source region 1d, and a drain region 1e. The scanning line 3a is formed so that a part thereof used as the gate electrode has a larger width, and the channel region 1a' (part indicated by the oblique lines in FIG. 5) is formed in a region at which the semiconductor layer 1a and the scanning line 3a oppose each other.

The lower shading film 12 is formed in areas corresponding to those in which the TFTs 30 are formed, to those in which the data lines 6a and the scanning lines 3a are formed which are described below, that is, in areas corresponding to non-display areas of the individual pixels. By this lower shading film 12, reflected light is prevented from being incident on the channel region 1a', the source region 1d, and the drain region 1e of the TFT 30 or such light is reduced from being incident.

A second interlayer insulating film 14 is provided on the TFT 30, and on the second interlayer insulating film 14, an island-shaped first intermediate conductive layer 15 is formed extending in the directions along the scanning line 3a and the data line 6a. Above the first intermediate conductive layer 15, a capacitor line 18 is disposed with a dielectric film 17 provided therebetween so as to oppose the first intermediate conductive layer 15. The capacitor line 18 is formed of an extending portion, which extends in the direction along the data line 6a so as to overlap the first intermediate conductive layer 15, and a major line extending in the direction along the scanning line 3a.

The first intermediate conductive layer 15 serves as a capacitor electrode (lower capacitor electrode) at a pixel potential side, which is connected to the highly doped drain region 1e of the TFT 30 and the pixel electrode 9a, and a part of the capacitor line 18 serves as a capacitor electrode at a fixed potential side (upper capacitor electrode 18a). The capacitor line 18 has a multilayer structure composed of the upper capacitor electrode 18a and a shading layer 18b and is disposed to oppose the first intermediate conductive layer 15 with the dielectric film 17 provided therebetween, thereby forming a storage capacitor (storage capacitor 70 in FIG. 2).

The capacitor line 18 has a multilayer structure formed, for example, of the upper capacitor electrode 18a composed of a conductive polycrystalline silicon film or the like and the shading layer 18b composed of a metal silicide film or the like containing a high melting point metal. For example, the capacitor line 18 is formed of a polycide which includes the shading layer 18b composed of a silicide containing one of tungsten, molybdenum, titanium, and tantalum and the upper capacitor electrode 18a composed of N-type polycrystalline silicon, for example. Accordingly, the capacitor line 18 forms an embedded shading film and, in addition, also functions as the capacitor electrode at a fixed potential side.

The first intermediate conductive layer 15 is formed, for example, of a conductive polycrystalline silicon film and functions as the capacitor electrode at the pixel potential side. In addition to the function as the capacitor electrode at the pixel potential side, the first intermediate conductive layer 15 also functions as a light absorbing layer provided between the capacitor layer 18 used as the embedded shading film and the TFT 30, and furthermore functions to connect between the pixel electrode 9a and the highly doped drain region 1e of the TFT 30. In addition, as is the capacitor line 18, the first intermediate conductive layer 15 may also be formed of a single film or a multilayer film, which contains a metal or an alloy.

The dielectric film 17 disposed between the first intermediate conductive layer 15 used as the lower capacitor electrode and the capacitor line 18 forming the upper capacitor electrode 18a is formed, for example, of a relatively thin silicon oxide film, such as a HTO (high temperature oxide) film or a LTO (low temperature oxide) film, or a silicon nitride film, having a thickness of approximately 5 to 200 nm. In order to increase the storage capacitance, the dielectric film 17 having a smaller thickness is more preferable as long as the reliability of the film can be ensured.

In addition, the capacitor line 18 is formed so as to extend from the image display area in which the pixel electrodes 9a are disposed to the periphery of the image display area and is electrically connected to a constant potential source so that the potential is fixed at a predetermined level. As the constant potential source, for example, there may be used a constant potential source, such as a positive or a negative power supply, to supply an electric power to a scanning line drive circuit 63 described below which sends scanning signals to the scanning lines 3a to drive the TFTs 30 or to a data line drive circuit 61 described below which controls a sampling circuit to send image signals to the data lines 6a; or a constant potential supplied to a counter electrode 21 of the counter substrate 20. In addition, in order to avoid or reduce the adverse influence on the TFT 30 caused by potential variation of the lower shading film 12, as is the capacitor line 18, the lower shading film 12 may be formed extending from the image display area to the periphery thereof so as to be connected to a constant potential source.

In addition, in order to electrically connect the data line 6a to the source region 1d, a second intermediate conductive layer 15b is formed using the same layer as that for the first intermediate conductive layer 15. The second intermediate conductive layer 15b is electrically connected to the source region 1d through a contact hole 24a penetrating the second interlayer insulating film 14 and the insulating film 2.

On the capacitor line 18, a third interlayer insulating film 19 is formed, and on the third interlayer insulating film 19, the data line 6a is provided. The data line 6a is electrically connected to the source region 1d through a contact hole 24b penetrating the third interlayer insulating film 19 and the dielectric film 17.

Above the data line 6a, the pixel electrode 9a is formed with a fourth interlayer insulating film 25 provided therebetween. The pixel electrode 9a is electrically connected to the first intermediate conductive layer 15 through a contact hole 26b penetrating the fourth interlayer insulating film 25, the third interlayer insulating film 19, and the dielectric film 17. The first intermediate conductive layer 15 is electrically connected to the drain region 1e through a contact hole 26a penetrating the second interlayer insulating film 14 and the insulating film 2. On the pixel electrodes 9a, an alignment film 16 composed of a polyimide-based material is formed and is processed by rubbing treatment in a predetermined direction.

When an ON signal is supplied to the scanning line 3a (gate electrode), the channel region 1a' is placed in a conduction state, the source region 1d and the drain region 1e are connected to each other, and an image signal supplied to the data line 6a is sent to the pixel electrode 9a.

In addition, on the counter substrate 20, a first shading film 23 is provided in areas which correspond to the data lines 6a, the scanning lines 3a, and the TFTs 30 are formed, that is, in non-display areas of individual pixels. By this first shading film 23, incident light from the counter substrate 20 side is prevented from being incident on the channel region 1a', the source region 1d, and the drain region 1e of the TFT 30 or such incident light is reduced. The counter electrode (common electrode) 21 is formed on the first shading film 23 and over the entire substrate 20. On the counter electrode 21, an alignment film 22 composed of a polyimide-based material is formed and is processed by rubbing treatment in a predetermined direction.

The liquid crystal 50 is enclosed between the TFT array substrate 10 and the counter substrate 20. Hence, the TFT 30 writes an image signal supplied form the data line 6a in the pixel electrode 9a at predetermined timing. In accordance with the potential difference between the pixel electrode 9a in which the signal is written and the counter electrode 21, the alignment and ordering of the molecular aggregate of the liquid crystal 50 is changed so that light is modulated, and hence gray scale display can be performed.

As shown in FIGS. 3 and 4, a shading film 42 is provided on the counter substrate 20 as a picture frame to define the display area. For example, the shading film 42 may be or may not be formed of the same shading material as that for the shading film 23.

A sealing material 41 to enclose the liquid crystal is provided outside the shading film 42 and between the TFT array substrate 10 and the counter substrate 20. The sealing material 41 is disposed so as to approximately coincide with the outline of the counter substrate 20 and tightly bonds the TFT array substrate 10 to the counter substrate 20. The sealing material 41 is not provided on a predetermined position of one side of the TFT array substrate 10, thereby forming a liquid crystal injection port 78 between the TFT array substrate 10 and the counter substrate 20 thus bonded to each other to inject the liquid crystal 50. After the liquid crystal is injected through the liquid crystal injection port 78, the liquid crystal injection port 78 is to be sealed with a sealing agent 79.

In an area outside the sealing material 41 of the TFT array substrate 10, a data line drive circuit 61 and mounting terminals 62 are provided along one side of the TFT array substrate 10, and along the two sides adjacent to said one side described above, scanning line drive circuits 63 are provided. Along the remaining one side of the TFT array substrate 10, a plurality of wires 64 are provided to connect the scanning line drive circuits 63 formed on the two sides opposing each other. In addition, at least one location of corner portions of the counter substrate 20, a conduction material 65 is provided to electrically connect between the TFT array substrate 10 and the counter substrate 20.

In this exemplary embodiment, the capacitor line 18 in plan view extends along the scanning line 3a and the data line 6a, and as shown in FIGS. 1, 5, 6(a) and 6(b), one end portion of the capacitor line 18 extends past the first intermediate conductive layer 15 in plan view (in the vertical direction). That is, at this one end portion, the dielectric film 17 is directly formed on the second interlayer insulating film 14, and on the dielectric film 17, the capacitor line 18 is formed.

In this exemplary embodiment, at the end portion described above, a contact hole 71 (black circle shown in FIGS. 5, 6(a) and 6(b) is formed which penetrates the dielectric film 17, the second interlayer insulating film 14, the insulating film 2, and the first interlayer insulating film 13, and by this contact hole 71, the upper capacitor electrode 18a of the capacitor line 18 is electrically connected to the lower shading film 12.

In addition, in this exemplary embodiment, because of a manufacturing method, which is described below, the upper capacitor electrode 18a of the capacitor line 18 is composed of a lower polycrystalline silicon layer 18a1 and an upper polycrystalline silicon layer 18a2, which are formed separately.

In this exemplary embodiment described above, the upper capacitor electrode 18a of the capacitor line 18 is electrically connected to the lower shading film 12 through the contact hole 71. The lower shading film 12 is formed of a conductive material and has a grating pattern extending along the data lines 6a and the scanning lines 3a so as to correspond to the individual pixels. That is, since the capacitor line 18 forming the upper capacitor electrode 18a of the storage capacitor is connected to the conductive material (lower shading film 12), which is formed under the TFT 30 and has the grating pattern, the resistance of the capacitance line 18 is decreased.

In addition, even when the capacitor line 18 in one pixel is broken, since the capacitance line of pixels disposed in the same line as that for the one pixel mentioned above is electrically connected to the lower shading film 12, the function as the capacitor electrode at a fixed potential side can be maintained. Hence, the wire breakage of the capacitor line 18 adversely influences display of only one pixel at which the capacitor line 18 is broken and do not influence display of the other pixels at all.

As described above, in this exemplary embodiment, since the upper capacitor electrode 18a of the capacitor line 18 is electrically connected to the lower shading film 12 having a grating pattern through the contact hole 71, the lower shading film 12 can be used as a redundant wire of the capacitor line 18. In addition, by the lower shading film 12, the resistance of the capacitor line 18 can be decreased.

In addition, in this exemplary embodiment, although the pixel switching TFT 30 having an LDD structure is described by way of example, an offset structure may be formed in which dopant implantation is not performed for a lightly doped source region and a lightly doped drain region, or the structure may be formed in a self alignment manner in which dopant implantation is performed at a high concentration using the gate electrode, which is a part of the scanning line 3a, as a mask for forming a highly doped source and drain region.

In this exemplary embodiment, although the pixel switching TFT 30 having a single gate structure is described in which only one gate electrode is disposed between the highly doped source region 1d and the highly doped drain region 1e, at least two gate electrodes may be disposed therebetween. When a TFT having, for example, a dual or a triple gate structure, leakage of current at the junction between the channel region and the source or the drain region can be prevented or reduced, and current flowing in an OFF state can be decreased.

In FIG. 5, an example is shown in which the capacitor line 18 is formed inside the area of the data line 6a and in which the lower shading film 12 is formed inside the area of the capacitor line 18. However, the widths of the data line 6a, the capacitor line 18, and the lower shading film may be the same or may be optionally different from each other. In addition, the lower shading film 12 is disposed inside the area of the intermediate conductive layer 15 extending along the scanning line 3a, and the scanning line 3a is disposed inside the area of the lower shading film 12; however, the widths of the intermediate conductive layer 15, the lower shading film 12, and the scanning line 3a may be the same or may be optionally different from each other.

Figure 8:
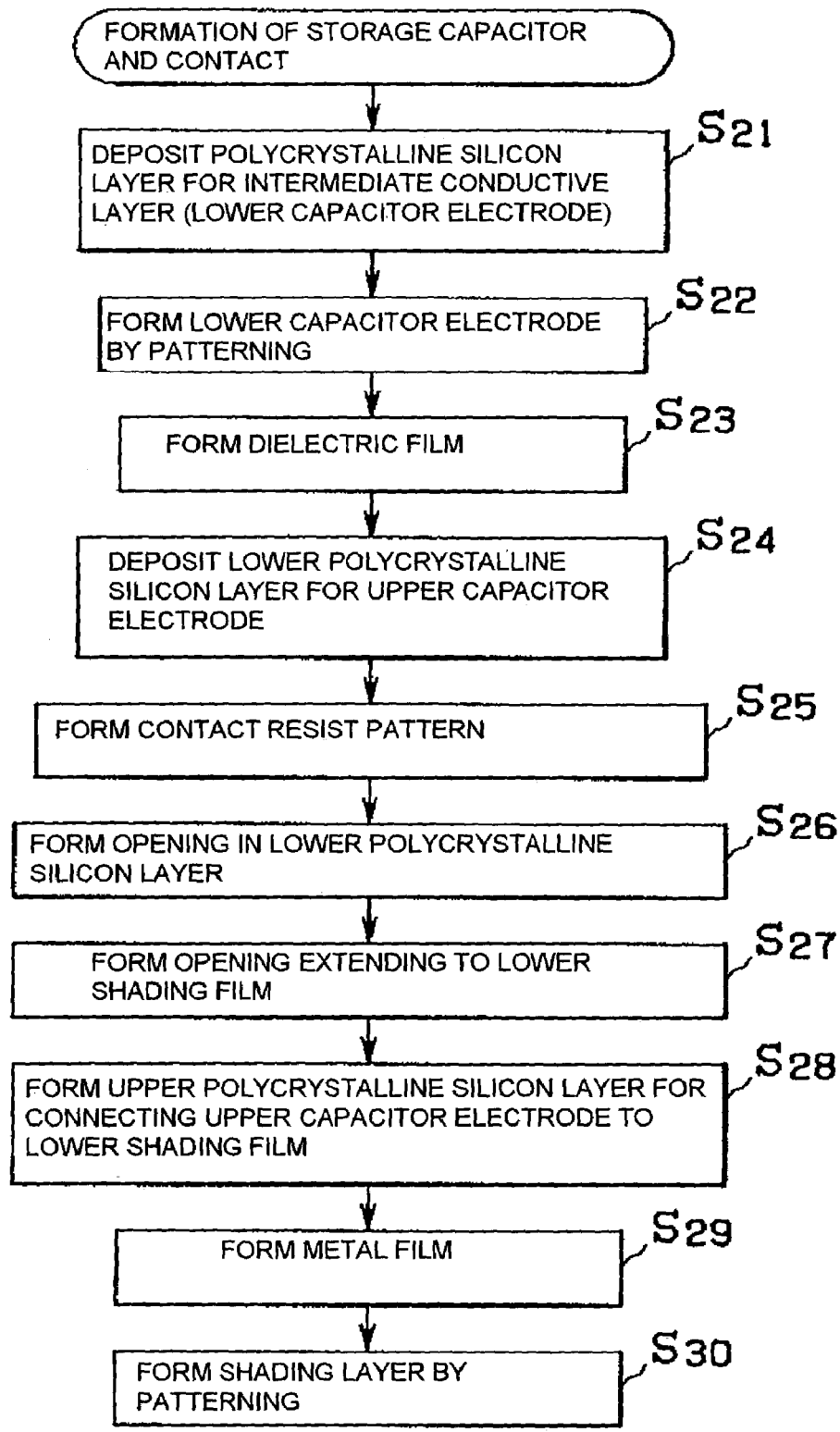
FIG. 8 is a flowchart showing a manufacturing method of a semiconductor element, according to a second exemplary embodiment of the present invention.
Figure 9:
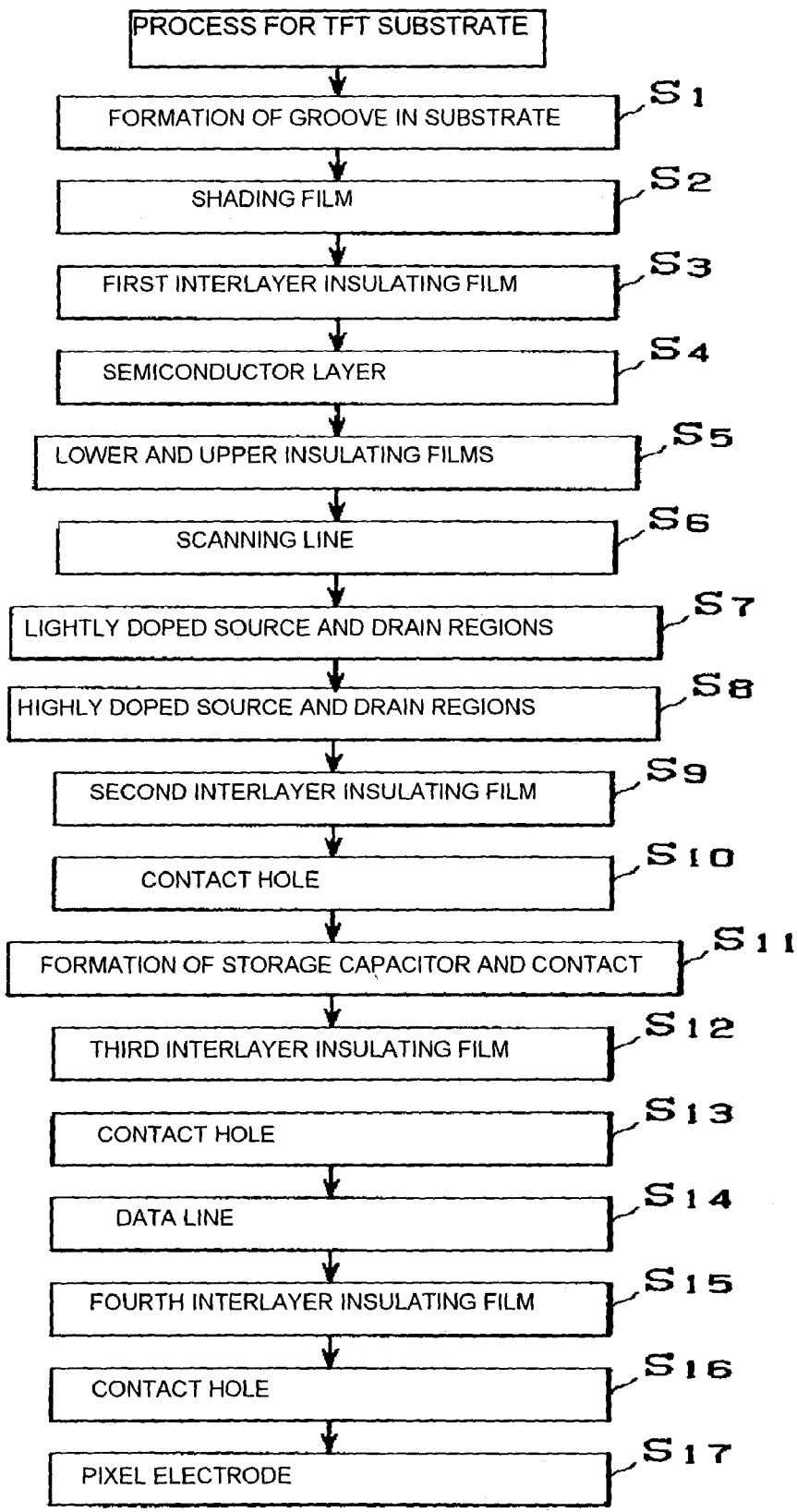
FIG. 9 is a flowchart showing a manufacturing method of the liquid crystal device shown in FIG. 1.

FIG. 8 is a flowchart showing a method of manufacturing a semiconductor element, according to a second exemplary embodiment of the present invention. In addition, FIG. 9 is a flowchart showing a method of manufacturing the liquid crystal device shown in FIG. 1. FIGS. 8 and 9 each show an example in which the manufacturing method is applied to the liquid crystal device shown in FIG. 1, and FIG. 8 particularly shows the step of forming the storage capacitor and the contact shown in FIG. 9. FIGS. 10(a)–10(c) show why the manufacturing method shown in FIG. 8 is advantageous, and FIGS. 11(a)–11(e) show sequential steps of forming the contact hole 71 according to the manufacturing method shown in FIG. 8.

First, referring to FIG. 9, the method of manufacturing the liquid crystal device shown in FIG. 1 is described below.

First, the TFT array substrate 10 composed of quartz, hard glass, silicon, or the like is prepared. Annealing treatment at a high temperature of approximately 900 to 1,300° C. in an inert gas atmosphere containing nitrogen ($N_2$) or the like is preferably performed so that the TFT array substrate 10 will not be so much distorted by a subsequent high temperature process.

In step S1 shown in FIG. 9, a groove 11 (see FIGS. 1 and 5 to 7) is formed in the TFT array substrate 10 by etching or the like. Next, in step S2 in FIG. 9, a film composed of a metal, such as Ti, Cr, W, Ta, Mo, or Pd, or a metal alloy, such as a metal silicide, is formed by sputtering so as to have a thickness of approximately 100 to 500 nm, and preferably, approximately 200 nm. Subsequently, by using photolithography and etching, the lower shading film 12 having a grating pattern in plan view is formed.

Next, in step S3, on the lower shading film 12, for example, by an atmospheric or a reduced-pressure CVD method using a TEOS (tetraethyl orthosilicate) gas, a TEB (tetraethyl borate) gas, a TMPO (tetramethyl oxyphosphate) gas, or the like, the interlayer insulating film 13 composed of a silicate glass film, such as NSG, PSG, BSG, or BPSG, a silicon nitride film, a silicon oxide film, or the like is formed. The thickness of this interlayer insulating film 13 is set, for example, to approximately 500 to 2,000 nm.

Next, in step S4, on the interlayer insulating film 13, an amorphous silicon film is formed by a reduced-pressure CVD method (such as a CVD method performed at a pressure of approximately 20 to 40 Pa) in which a silane gas, such as a monosilane gas or a disilane gas, is used at a flow rate of approximately 400 to 600 cc/minute in a relatively low temperature atmosphere at approximately 450 to 550° C., and preferably, at approximately 500° C. Subsequently, in a nitrogen atmosphere, by annealing treatment performed at approximately 600 to 700° C. for approximately 1 to 10 hours, and preferably, for 4 to 6 hours, a polycrystalline silicon film is formed by solid-phase growth so as to have a grain diameter of approximately 50 to 200 nm, and preferably, approximately 100 nm. As a method for performing solid-phase growth, for example, annealing treatment using RTA (rapid thermal anneal) or laser annealing using excimer laser may be used. In this case, depending on whether the pixel switching TFT 30 has an N-type channel or a P-type channel, dopant containing a Group V or a Group III element in a small amount may be doped by ion implantation or the like. Subsequently, by photolithography and etching, the semiconductor layer 1a having a predetermined pattern is formed.

Next, in step S5, after thermal oxidation of the semiconductor layer 1a forming the TFT 30 is performed at approximately 900 to 1,300° C., and preferably, at approximately 1,000° C., and reduced-pressure CVD is then performed, or the two steps described above are continuously performed, the insulating film 2 (including the gate insulating film) is formed containing a high temperature silicon oxide film (HTO film) and a silicon nitride file used as a bottom layer and a top layer.

As a result, the semiconductor layer 1a has a thickness of approximately 30 to 150 nm, and preferably, of approximately 35 to 50 nm, and the thickness of the insulating film 2 has a thickness of approximately 20 to 150 nm, and preferably, of approximately 30 to 100 nm.

Next, in order to control the threshold voltage Vth of the pixel switching TFT 30, a dopant, such as boron in a predetermined amount, is doped in an N-type channel region or a P-type channel region of the semiconductor layer 1a by ion implantation or the like.

Next, in step S6, a polycrystalline silicon film is formed by deposition using a reduced-pressure CVD method or the like, and thermal diffusion of phosphorus (P) is then performed so as to make the polycrystalline silicon have electrical conductivity. Alternatively, formation of polycrystalline silicon and doping of P ions therein are simultaneously performed, and the doped silicon film thus formed may be used. The thickness of this polycrystalline silicon film is approximately 100 to 500 nm, and preferably, approximately 350 nm. Subsequently, by photolithography and etching, the scanning line 3a having a predetermined pattern, including the gate electrode portion of the TFT 30, is formed.

For example, when the TFT 30 is formed as an N-type channel TFT having an LDD structure, in order to form the lightly doped source region and the lightly doped drain region, a dopant containing a V Group element, such as P, is doped (step S7) in the semiconductor layer 1a at a low concentration (for example, P ions at a dose of 1 to $3 \times 10^{13}$/ $cm^2$) by using the scanning line 3a (gate electrode) as a mask. As a result, the semiconductor layer 1a under the scanning line 3a is formed as the channel region 1a'.

In addition, in order to form the highly doped source region 1d and the highly doped drain region 1e, a resist layer is formed on the scanning line 3a, the resist layer having a planar pattern in which the width thereof is larger than that of the scanning line 3a. Subsequently, a dopant containing a V Group element, such as P, is doped (step 8) at a high concentration (for example, P ions at a dose of 1 to $3 \times 10^{15}$/ $cm^2$).

As described above, an element having the LDD structure in which the lightly doped source and drain regions and the highly doped source and drain regions are formed. In addition, for example, without performing doping at a low concentration, a TFT having an offset structure may be formed, and a self-alignment type TFT may also be formed by ion implantation of P ions, B ions, or the like using the scanning line 3a as a mask. By this doping of the dopant described above, the resistance of the scanning line 3a is further decreased.

Next, in step S9, on the scanning line 3a, for example, by an atmospheric or a reduced-pressure CVD method using a TEOS gas, a TEB gas, a TMPO gas, or the like, the second interlayer insulating film 14 composed of a silicate glass film, such as NSG, PSG, BSG, or BPSG, a silicon nitride film, a silicon oxide film, or the like is formed. The thickness of this second interlayer insulating film 14 is set, for example, to approximately 500 to 2,000 nm. In this step, annealing treatment at a high temperature of approximately 800° C. is preferably performed so that the quality of the interlayer insulating film 14 is enhanced.

Next, in step 10, by performing dry etching such as reactive ion etching or reactive ion beam etching for the second interlayer insulating film 14, the contact hole 24a is formed.

Next, in this exemplary embodiment, in step 11 described below, the storage capacitor composed of the first intermediate conductive layer 15, the dielectric film 17, and the capacitor line 18, the second intermediate conductive layer 15b, the contact holes 24a and 26a, and the like are formed.

Next, in step S12, for example, by an atmospheric or a reduced-pressure CVD method using a TEOS gas or the like, the third interlayer insulating film 19 composed of a silicate glass film, such as NSG, PSG, BSG, or BPSG, a silicon nitride film, a silicon oxide film, or the like is formed. The thickness of this third interlayer insulating film 19 is for example, approximately 500 to 1,500 nm.

Next, in step 13, by performing dry etching, such as reactive ion etching or reactive ion beam etching for the third interlayer insulating film 19, the contact hole 24b is formed.

Next, in step S14, a metal film formed of a low-resistance metal, such as Al or a metal silicide, which has shading properties and a thickness of approximately 100 to 500 nm, and preferably, approximately 300 nm, is formed over the entire surface of the third interlayer insulating film 19 so as to fill the contact holes 24b. Subsequently, by photolithography and etching, the data line 6a having a predetermined pattern is formed.

Next, in step S15, so as to cover the data line 6a, for example, by an atmospheric or a reduced-pressure CVD method using a TEOS gas or the like, the fourth interlayer insulating film 25 composed of a silicate glass film, such as NSG, PSG, BSG, or BPSG, a silicon nitride film, a silicon oxide film, or the like is formed. The thickness of this fourth interlayer insulating film 25 is, for example, approximately 500 to 1,500 nm.

Next, in step 16, by performing dry etching, such as reactive ion etching or reactive ion beam etching for the fourth interlayer insulating film 25 and the third interlayer insulating film 19, the contact hole 26b is formed.

Next, in step S17, on the internal surface of this contact hole 26b and on the fourth interlayer insulating film 25, a transparent conductive film such as an ITO film is deposited so as to have a thickness of approximately 50 to 200 nm. In addition, by photolithography and etching, the pixel electrode 9a is formed. When the liquid crystal device is used for a reflective type device, the pixel electrode 9a may be formed of an opaque material having a high reflectance such as Al. The contact hole 26b connects between the first interlayer conductive layer 15 and the pixel electrode 9a.

Next, for the TFT array substrate 10 and the counter substrate 20 thus formed, a panel assembly process is performed. In this panel assembly process, a polyimide (PI) resin forming the alignment films 16 and 22 is first applied to the TFT array substrate 10 and the counter substrate 20.

Next, for the alignment film 16 on the surface of the TFT array substrate 10 and the alignment film 22 on the surface of the counter substrate 20, rubbing treatment is performed. Subsequently, a washing step is performed. This washing step is performed to remove dust generated in the rubbing treatment. After the washing treatment is completed, the sealing material 41 and the conduction material 65 (see FIG. 3) are formed. After the sealing material 41 is formed, the TFT array substrate 10 is adhered to the counter substrate 20, and while alignment is being performed, they are compressed to each other so as to cure the sealing material 41. Finally, the liquid crystal is injected from a cutaway formed in a part of the sealing material 41 and is then enclosed by sealing the cutaway.

FIGS. 10(a)–10(c) illustrate sequential steps for forming the contact hole 71 according to a general method of manufacturing a semiconductor element.

On the second interlayer insulating film 14, the first intermediate conductive layer 15 is formed. On the first intermediate conductive layer 15 and the second interlayer insulating film 14, the dielectric film 17 is then formed. After the dielectric film 17 is formed, a resist 75 is formed on the dielectric film 17 (FIG. 10(a)), and a contact hole 72 is formed by dry etching (FIG. 10(b)).

Next, after the resist 75 is removed, a polycrystalline silicon film is formed on the dielectric film 17 by deposition, and subsequently, thermal diffusion of phosphorus (P) or the like is performed so as to make the polycrystalline silicon film have electrical conductivity, thereby forming the upper capacitor electrode 18a (FIG. 10(c)). Furthermore, after a metal or an alloy, such as a metal silicide, is formed on the upper capacitor electrode 18a as the shading layer 18b, the capacitor line 18 having a predetermined pattern is formed by photolithography.

However, according to the method described above, when the resist 75 is removed, damage is done to the dielectric film 17. Due to the damage done to the dielectric film 17, as described above, a problem may arise in that the initial withstand voltage properties are likely to be degraded.

Accordingly, in this exemplary embodiment, the manufacturing method shown in FIG. 8 is used. FIG. 8 is a flowchart showing particular steps included in step S11 shown in FIG. 9. In addition, FIG. 11 includes cross-sectional views of the contact hole 71 portion in accordance with the sequential steps shown in FIG. 8.

That is, in this exemplary embodiment, before the contact hole 71 is formed, polycrystalline silicon, which is to be formed into a part of the upper capacitor electrode 18a of the capacitor line 18, is formed on the dielectric film 17 for protection thereof from etching. When etching is performed, the polycrystalline silicon formed on the dielectric film 17 is used as a-hard mask, and after the contact hole is formed, polycrystalline silicon is further deposited so as to have a necessary thickness, thereby forming the upper capacitor electrode 18a of the capacitor line 18.

In step S21 shown in FIG. 8, the first intermediate conductive layer 15 which is to be used as the lower capacitor electrode of the storage capacitor is first formed. That is, a polycrystalline silicon film is deposited on the second interlayer insulating film 14 by a reduced-pressure CVD method or the like, and subsequently, thermal diffusion of phosphorus (P) is performed so as to make the polycrystalline silicon film have electrical conductivity. Alternatively, formation of polycrystalline silicon and doping of P ions therein are simultaneously performed, and the doped silicon film thus formed may be used. The thickness of this polycrystalline silicon film is approximately 100 to 500 nm, and preferably, approximately 150 nm. Subsequently, by photolithography and etching, the first intermediate conductive layer 15 is formed (step S22).

In subsequent step S23, the dielectric film 17 is formed. That is, on the second interlayer insulating film 14 and the first intermediate conductive layer 15 also used as the capacitor electrode at the pixel potential side, the dielectric film 17 composed of a high temperature silicon oxide film (HTO film) or a silicon nitride film is formed by a reduced-pressure CVD method, a plasma CVD method, or the like so as to have a relatively small thickness of approximately 50 nm.

As is the case of the insulating film 2, the dielectric film 17 maybe composed of a single film or a multilayer film and may be formed by various known, related art or later developed techniques generally used to form a gate insulating film of a TFT. In addition, since the storage capacitance is increased with decrease in thickness of the dielectric film 17, as long as the defects, such as film break, do not occur, the dielectric film 17 is advantageously formed so as to be a very thin insulating film having a thickness of 50 nm or less.

In this exemplary embodiment, one end of the dielectric film 17 has an extending portion in plan view (in the vertical direction) extending past the first intermediate conductive layer 15, and at this extending portion, the dielectric film 17 is directly formed on the second interlayer insulating film 14 (see FIGS. 1 and 11(a)).

Next, on the dielectric film 17, the upper capacitor electrode 18a of the capacitor line 18 is formed. In this exemplary embodiment, the upper capacitor electrode 18a of the capacitor line 18 is composed of two layers which are separately formed. That is, first, in step S24, the lower polycrystalline silicon layer 18a1 is formed (FIG. 11(a)). This lower polycrystalline silicon layer 18a1 is formed of a polycrystalline silicon film deposited by a reduced-pressure CVD method or the like. The thickness of the lower polycrystalline silicon layer 18*a*1 has a proper ratio to that of the upper polycrystalline silicon layer 18*a*2 described below. For example, when the total thickness of the upper capacitor electrode 18*a* of the capacitor line 18 is 150 nm, the thickness of the lower polycrystalline silicon layer 18*a*1 is set to 50 nm, and the upper polycrystalline silicon layer 18*a*2 is set to 100 nm.

Next, in step S25, a resist pattern 76 for forming the contact hole 71 is formed (FIG. 11(*b*)). The lower polycrystalline silicon layer 18*a*1 is then selectively etched by an etching technique (step S26) (FIG. 11(*c*)). After a contact hole is formed in the lower polycrystalline silicon layer 18*a*1, the resist pattern 76 is removed. Since the resist pattern 76 is not formed on the dielectric film 17, when the resist is removed, the dielectric film 17 is not damaged at all.

Next, in step S27, the contact hole 71 extending to the lower shading film 12 is formed. That is, by using the lower polycrystalline silicon layer 18*a*1 having the opening at the contact portion as a hard mask and an etcher different from that used in step S25, an opening is formed in the dielectric film 17, the second interlayer insulating film 14, the insulating film 2, and the first interlayer insulating film 13 at the position under the opening portion of the lower polycrystalline silicon layer 18*a*1 (FIG. 11(*d*)).

Next, in step S28, the upper polycrystalline silicon layer 18*a*2 is formed so that the capacitor line 18 has a necessary thickness (in the example described above, the thickness is 100 nm). That is, a polycrystalline silicon film is formed by deposition using a reduced-pressure CVD method or the like. By using a reduced-pressure CVD method, coverage of the contact hole 71 is enhanced. In addition, thermal diffusion of phosphorus (P) is performed so as to make this polycrystalline silicon film have electrical conductivity, thereby forming the upper capacitor electrode 18*a* of the capacitor line 18. Furthermore, on the upper capacitor electrode 18*a*, a metal or an alloy film, such as a metal silicide, is formed by sputtering followed by annealing treatment (step S29), and the shading layer 18*b* is then formed by patterning of the film described above using photolithography and etching (FIG. 11(*e*)).

As described above, in this exemplary embodiment, in the case in which the contact is formed between the upper capacitor electrode and the lower shading film formed under the TFT, the upper capacitor electrode of the capacitor line is formed of two different polycrystalline silicon layers, and before the resist pattern is formed, the lower polycrystalline silicon of the two different polycrystalline silicon layers described above is formed on the dielectric film. Hence, the dielectric film is protected from the resist pattern. After the contact hole is formed, the upper polycrystalline silicon layer is formed, thereby forming the capacitor line composed of the lower and the upper polycrystalline silicon layers. Accordingly, the dielectric film is prevented from being damaged when the resist is removed, or such damage is reduced, and as a result, the generation of the initial withstand voltage failure can be avoided or reduced. In addition, when the contact hole is formed, the number of photolithographic steps is not increased, and as a result, a high quality capacitor can be formed by a simple process.

[Advantages]

As described above, according to the present invention, the quality of the display image is enhanced by further decreasing the resistance of the capacitor line, and even when the capacitance line is broken, degradation of display quality is allowed only in the corresponding one pixel, thereby maintaining the high quality image display. Furthermore, the generation of the initial withstand voltage failure of the dielectric film forming the storage capacitor can be advantageously reduced or suppressed.

What is claimed is:

1. An electro-optical device, comprising:
   a substrate;
   pixel electrodes provided in a matrix above the substrate;
   a storage capacitor which is formed of a first capacitor electrode electrically connected to one of the pixel electrodes, a second capacitor electrode electrically connected to a fixed potential, and a dielectric film disposed between the first capacitor electrode and the second capacitor electrode, and which is disposed to correspond to the one of the pixel electrodes by using the second capacitor electrode as a capacitor line;
   a conductive pattern formed above the substrate; and
   a contact hole connecting the second capacitor electrode forming the storage capacitor to the conductive pattern, the second capacitor electrode being composed of an upper layer and a lower layer, the lower layer being formed before the contact hole is formed, and the upper layer being formed after the contact hole is formed.

2. A method of manufacturing a semiconductor element, comprising:
   forming a conductive pattern above a substrate;
   forming a first capacitor electrode to be electrically connected to a pixel electrode above the conductive pattern with at least one interlayer film provided therebetween;
   forming a dielectric film on the first capacitor electrode;
   forming a lower capacitor electrode disposed on the dielectric film;
   forming a contact hole by forming an opening in the lower capacitor electrode and then forming an opening in the dielectric film and the at least one interlayer film by using the lower capacitor electrode having the opening therein as mask; and
   forming an upper capacitor electrode above the lower capacitor electrode which includes the contact hole formed in the lower capacitor electrode, the dielectric film, and the at least one interlayer film,
   the lower capacitor electrode and the upper capacitor electrode, each being a part of a second capacitor electrode which forms a storage capacitor together with the first capacitor electrode and the dielectric film.

3. The method of manufacturing a semiconductor element according to claim 2, the step of forming the contact hole including:
   forming a resist layer on the lower capacitor electrode;
   forming the openings in the lower capacitor electrode using the resist layer;
   removing the resist layer; and
   subsequently forming the opening in the dielectric film and the at least one interlayer film using the lower capacitor electrode provided with the opening as a mask.

4. A method for manufacturing a semiconductor element, according to claim 2,
   wherein the lower capacitor electrode and the upper capacitor electrode is formed of polycrystalline silicon.

5. A method for manufacturing a semiconductor element, according to claim 4,
   wherein the polycrystalline silicon is provided with a metal silicide thereon.

6. An electro-optical device, comprising:
   a substrate;
   a conductive pattern in a matrix formed above the substrate so as to correspond to pixel positions;

pixel transistors formed in a matrix, each of the pixel transistors including a channel region, a source region, and a drain region, which are formed in the same semiconductor layer provided above the conductive pattern with a first interlayer film provided therebetween;

a first capacitor electrode formed above the pixel transistor with a second interlayer film provided therebetween;

a dielectric film formed on the first capacitor electrode;

a second capacitor electrode formed on the dielectric film and functioning as a capacitor line, the second capacitor electrode being composed of an upper layer and a lower layer; and a contact hole connecting the second capacitor electrode to the conductive pattern, the lower layer being formed before the contact hole is formed, and the upper layer being formed after the contact hole is formed.

* * * * *